(12) United States Patent
Mohler et al.

(10) Patent No.: US 6,805,832 B2
(45) Date of Patent: Oct. 19, 2004

(54) THERMITE TORCH CUTTING NOZZLE

(76) Inventors: Jonathan Mohler, 5946 62nd La., Vero Beach, FL (US) 32967; Timothy W. Mohler, 160 Yacht Club Way #303, Lantana, FL (US) 33462

( * ) Notice: Subject to any disclaimer, the term of this patent is extended or adjusted under 35 U.S.C. 154(b) by 90 days.

(21) Appl. No.: 10/191,607

(22) Filed: Jul. 9, 2002

(65) Prior Publication Data

US 2003/0006538 A1 Jan. 9, 2003

Related U.S. Application Data

(60) Provisional application No. 60/303,949, filed on Jul. 9, 2001.

(51) Int. Cl.⁷ ................................................ B23K 7/00
(52) U.S. Cl. ........................................ 266/48; 148/194
(58) Field of Search ............................. 266/48; 148/194

(56) References Cited

U.S. PATENT DOCUMENTS

| | | | |
|---|---|---|---|
| 2,587,243 A | | 2/1952 | Sweetman |
| 3,732,060 A | * | 5/1973 | Churchill et al. ........... 431/344 |
| 4,464,989 A | | 8/1984 | Gibson et al. |
| 4,559,890 A | * | 12/1985 | Regalbuto et al. ............ 266/48 |
| 4,601,761 A | * | 7/1986 | Proctor et al. .............. 148/204 |
| 4,693,181 A | | 9/1987 | Dadley et al. |
| 4,815,384 A | | 3/1989 | Ringel et al. |
| 4,963,203 A | | 10/1990 | Halcomb et al. |
| 4,996,922 A | | 3/1991 | Halcomb et al. |
| 6,183,569 B1 | | 2/2001 | Mohler |

\* cited by examiner

*Primary Examiner*—Scott Kastler
(74) *Attorney, Agent, or Firm*—William F. Lang, IV; Eckert Seamans Cherin & Mellott, LLC

(57) ABSTRACT

An improved nozzle for thermite cutting torches provides an elongated nozzle dimensioned and configured to direct a maximized flow of cutting flame to the desired cutting location on a workpiece. The nozzle includes an exterior wall defining the nozzle face having an arc dimensioned and configured to center the cutting aperture over the desired cut when the cutting torch is clamped to the workpiece. The nozzle also includes a groove for directing the flow of reaction products, thereby minimizing backpressure in the nozzle region, and eliminating the need for a standoff distance.

12 Claims, 9 Drawing Sheets

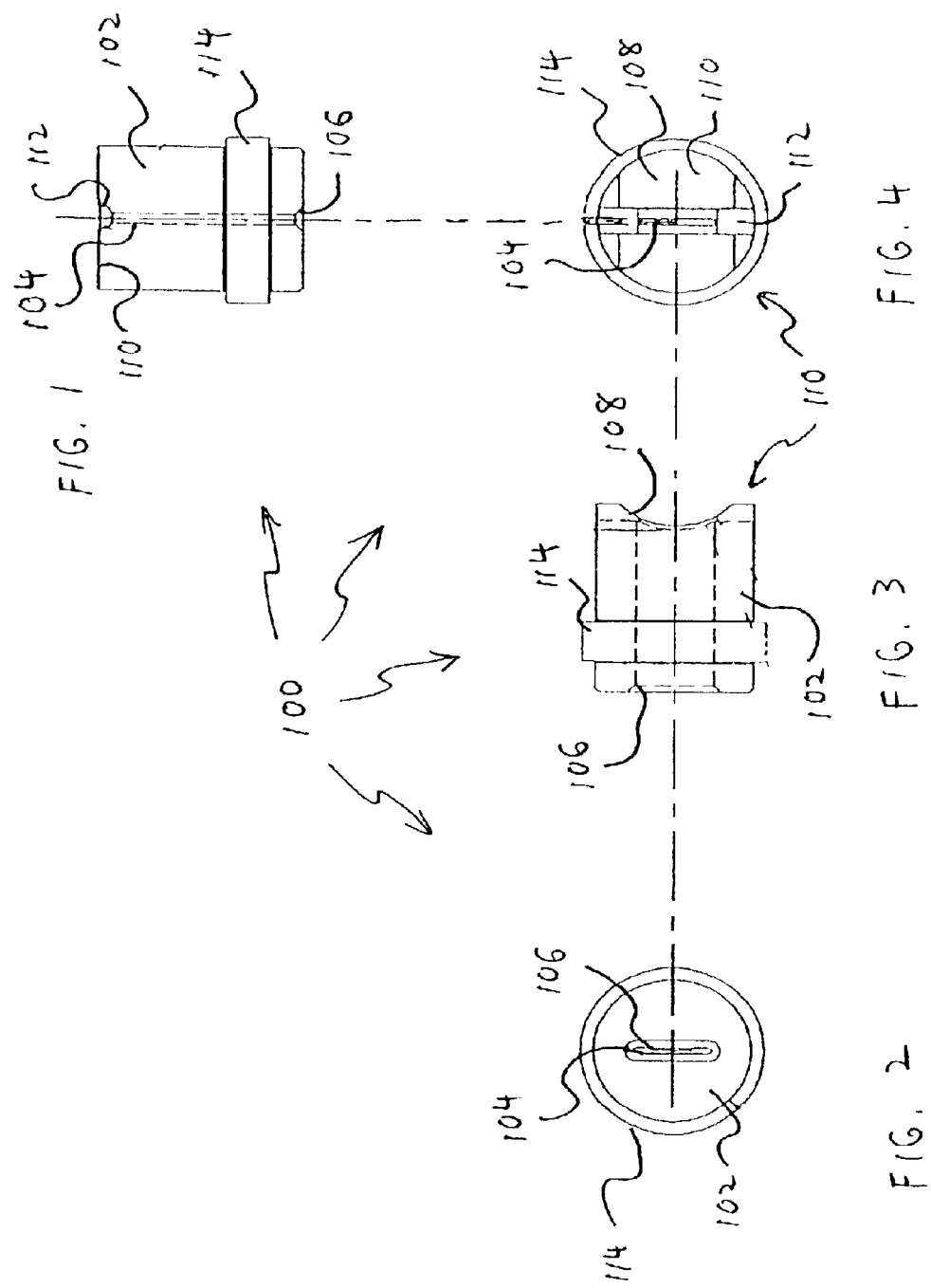

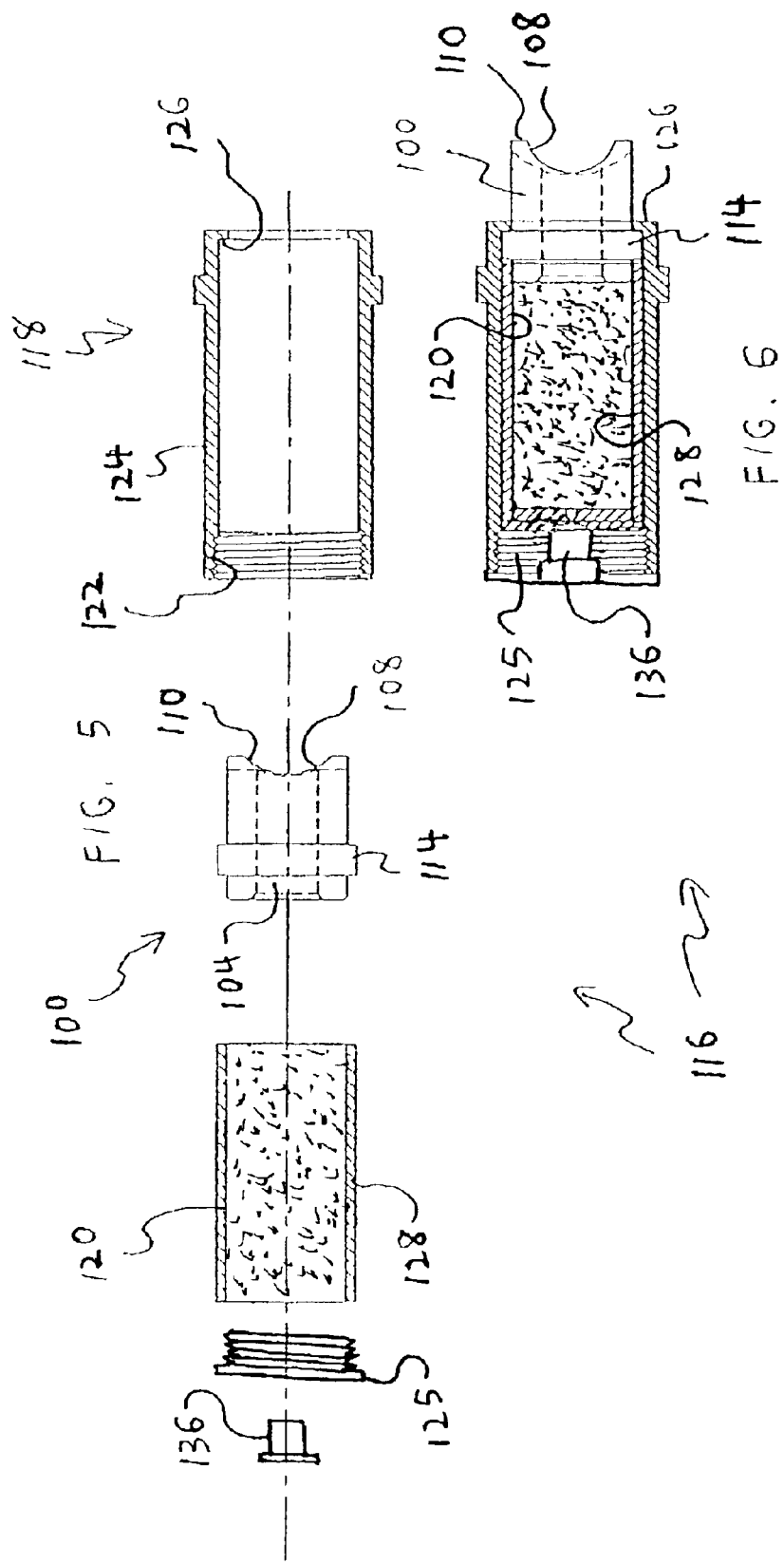

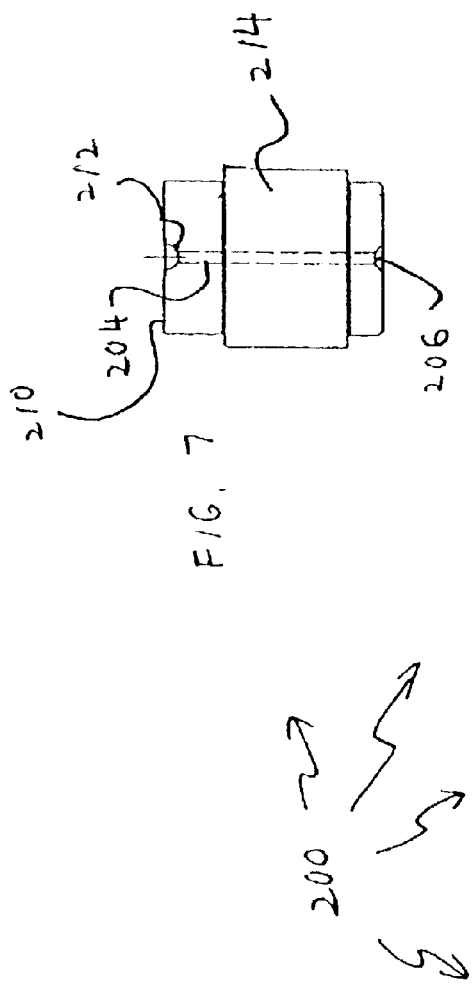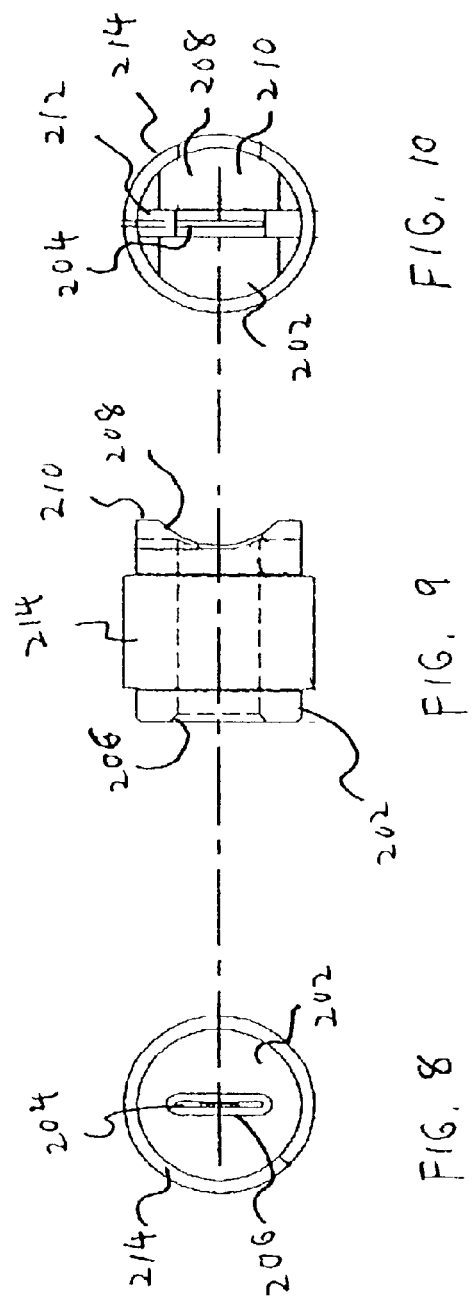

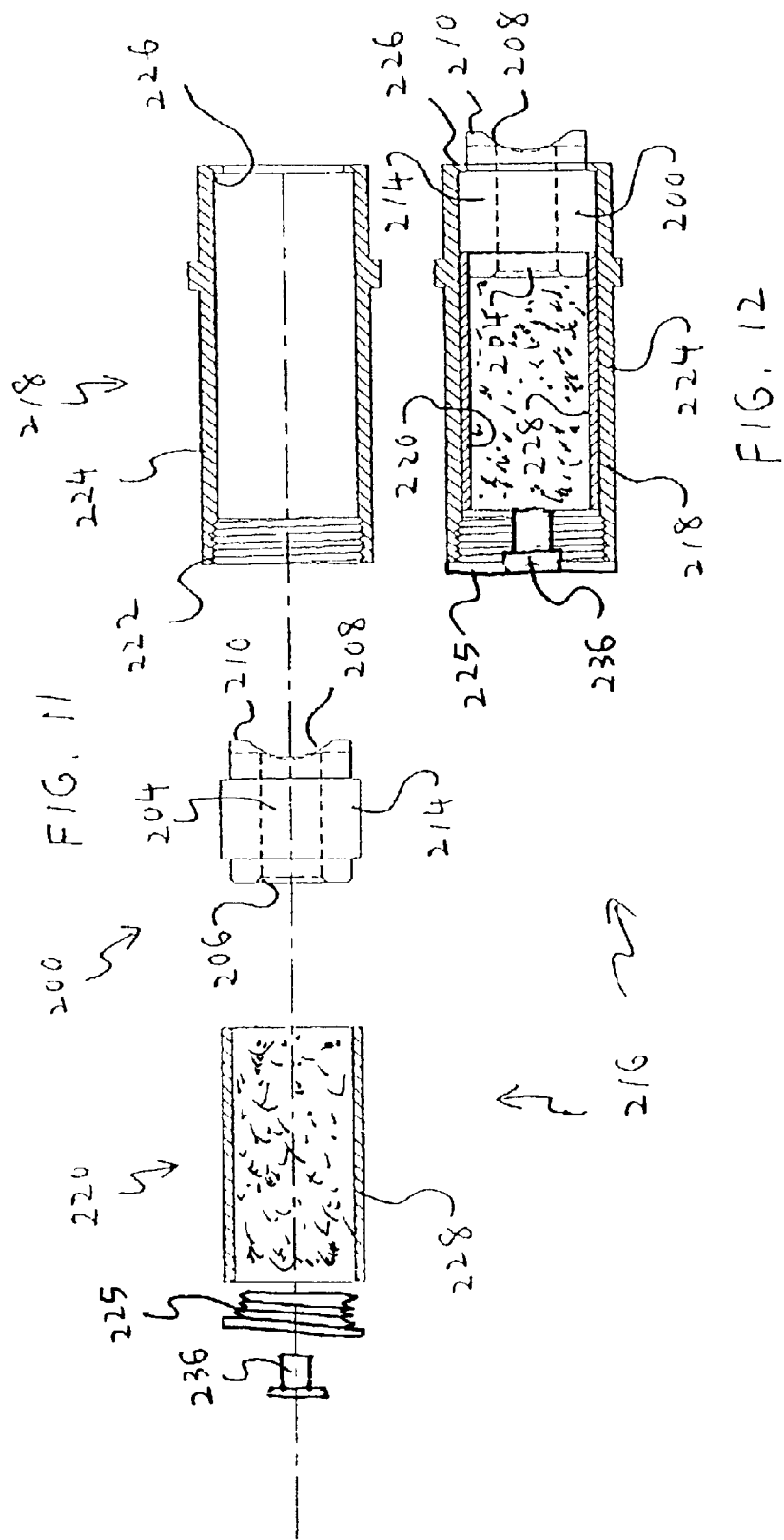

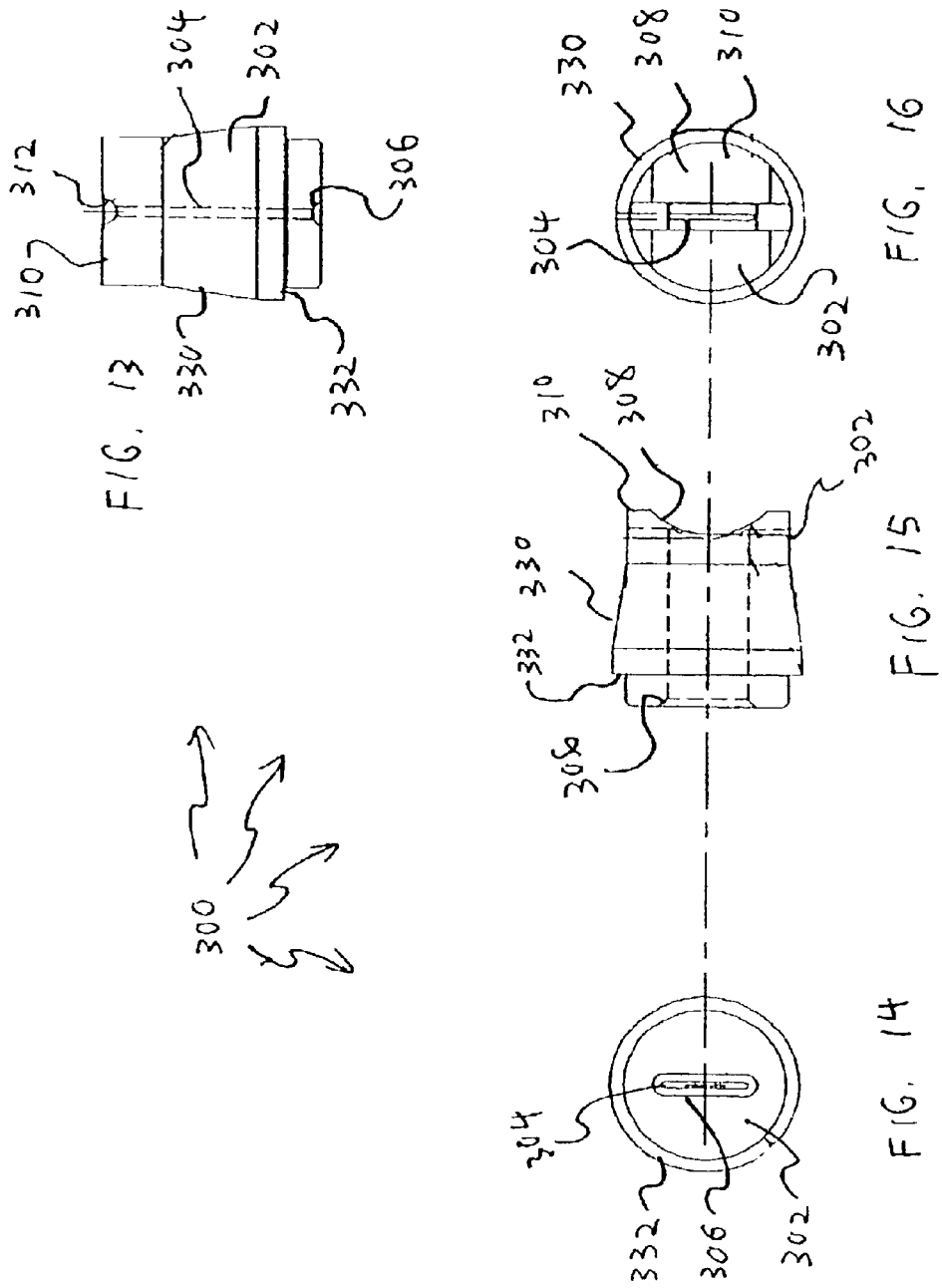

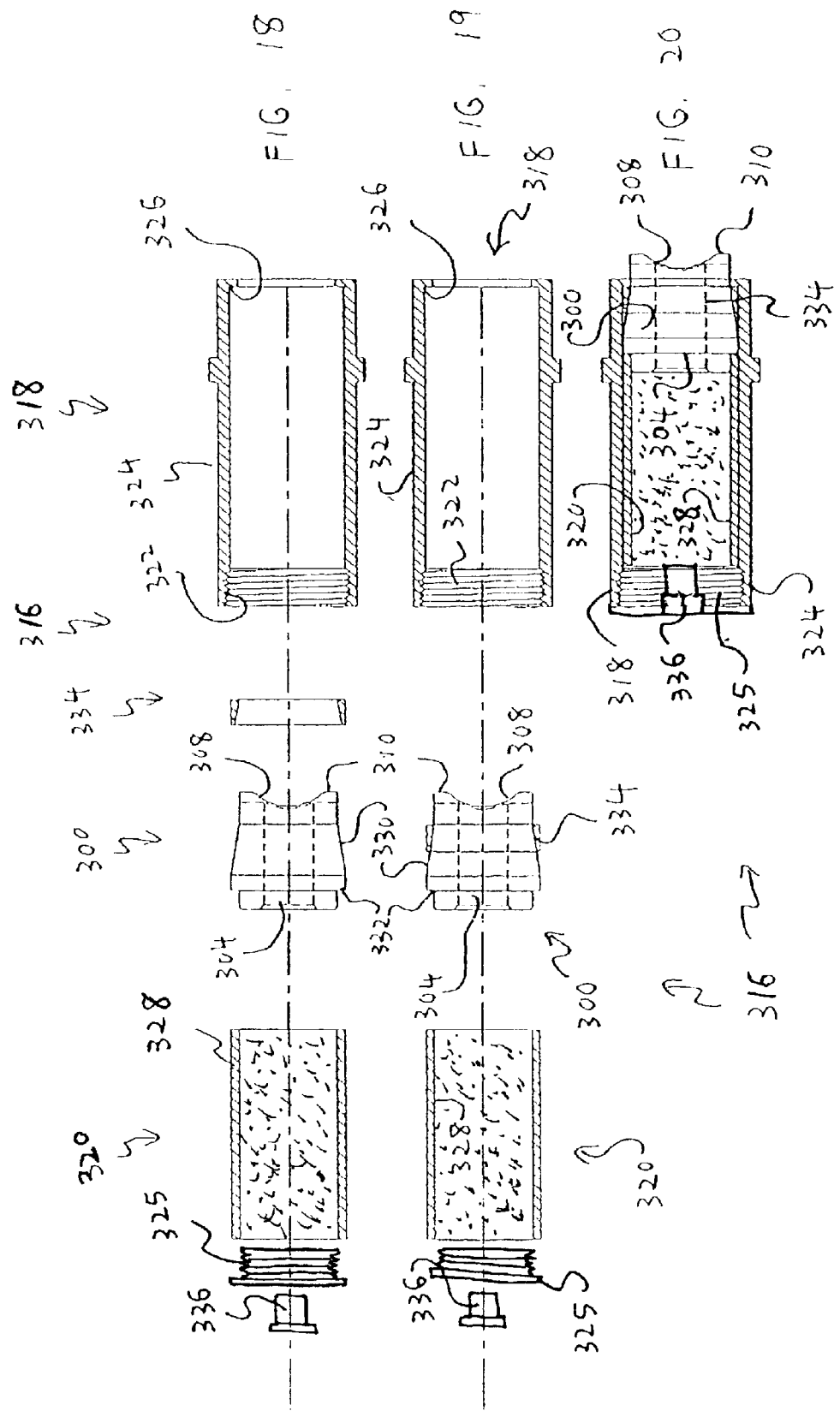

THERMITE TORCH CUTTING NOZZLE

CROSS REFERENCE TO RELATED APPLICATIONS

This Application claims the benefit of U.S. Provisional Application Ser. No. 60/303,949, filed Jul. 9, 2001.

BACKGROUND OF THE INVENTION

1. Field of the Invention

The present invention generally relates to an apparatus and method for cutting target material. The present invention more particularly relates to an apparatus and method for cutting target material of a substantial thickness using a thermite based charge.

2. Description of the Related Art

A number of devices for cutting materials of a substantial thickness are known in the art. Many of these devices employ explosive shaped charges which deliver energy to the surface of a material in the form of a high pressure, high velocity shock front. The conical or "V" shaped charge, for example, explodes and focuses cutting energy onto the surface of the material to be cut. A primary disadvantage of explosive shaped charges is that they generate excessive noise and debris upon detonation. This noise and debris can pose potentially serious health and safety hazards to someone using a cutting device which employs conventional shaped charge explosives.

U.S. Pat. No. 2,587,243 discloses an apparatus for producing a gaseous penetrating jet for cutting materials or objects. This patent uses a chemical charge which, when detonated, ruptures a means interposed along the path of the generated high velocity gases. The means converges upon rupture and causes a material placed beneath the apparatus to be cut by the resultant high velocity gas explosion.

U.S. Pat. No. 4,693,181 discloses a linear cutting charge device including an explosive mass formed in the shape of a bar. Detonation of the charge in this patent is disclosed as stating that it compresses a metal liner and converts the metal liner into an outwardly projected slug of metal, the shape of which is dependent upon the shape of a cavity of the device. It is this outwardly projected slug which penetrates the work surface of a material which is cut or deformed by the detonation and subsequent penetration.

U.S. Pat. No. 4,815,384 discloses a device with a housing for use with joinable or interconnectable cutting charges. The stated purpose of this patent is to avoid formation of a saw-tooth cutting profile on a target work surface acted upon by the device discussed in the patent.

Thermite-based cutting devices which employ a cutting flame produce virtually no extended shock wave and generate relatively little over pressure. Thermite-based cutting devices do not present the same health and safety hazards which are attendant upon explosive shape charge cutting devices.

What has not been disclosed in the prior art, however, is use of a thermite-based apparatus for directing or focusing a cutting flame derived from the activation of a thermite charge for the purpose of effectively focusing the cutting flame across a desired cutting location on an elongated, round or possibly rectangular workpiece, and for providing relief for reaction products, thereby preventing back pressure around the nozzle.

In spite of the foregoing known apparatus and methods for cutting material, there remains a real and substantial need for an apparatus for cutting material which employs a thermite-based charge to ensure a safe and efficient cutting action.

SUMMARY OF THE INVENTION

The present invention is an improved nozzle for thermite-based cutting torches. A typical thermite cutting torch utilizing the present invention will include a housing having an inner cavity, and securing the nozzle of the present invention. An energetic material, for example, a thermite charge, is contained within the housing's inner cavity to provide the torch with a source of cutting flame. An activating device, such as an igniter, is coupled to the thermite charge.

The nozzle of the present invention includes an elongated aperture, thereby providing for maximum flow of cutting flame to the desired location of the cut. The nozzle face is dimensioned and configured to eliminate the need for a standoff distance between the aperture and the workpiece, by defining an arc to match the contours of the largest workpiece the torch is designed for, and a groove for eliminating backpressure and directing flow of reaction products from the nozzle. This arc will ensure that the torch is self-centering when held against the workpiece. The nozzle face also defines a groove coincident with the long axis of the nozzle when viewed from either the top (back) or bottom (face), permitting free flow of reaction products in the direction of the desired cut, and out of the cutting area once they have exited the aperture and contacted the workpiece. This free path provides for minimized backpressure within the nozzle area and optimal energy delivery to the cutting zone.

The activation means for igniting the thermite charge may be any conventionally known activation means, or alternatively may be a primer, such as is typically used to ignite the powder within a firearm cartridge. The torch may therefore be activated by striking the primer, thereby igniting the priming compound, which in turn ignites the thermite charge.

The cutting torch may be held against the work piece either by clamping it against the work piece, or by holding the cutting torch using a holder having a means for striking the activation means, for example, a trigger mechanism and firing pin as is typically used to strike the primer of a cartridge within a firearm.

It is therefore an object of the present invention to provide a nozzle for thermite cutting torches maximizing the flames directed towards the desired cut.

It is another object of the present invention to provide a nozzle for thermite cutting torches eliminating the need for a standoff distance between the nozzle and the workpiece.

It is a further object of the present invention to provide a nozzle for thermite torches providing for centering of the nozzle aperture over the desired cut.

It is another object of the present invention to provide a nozzle for thermite cutting torches having a groove for providing a free path for reaction products, thereby minimizing backpressure within the nozzle region.

It is a further object of the present invention to provide a thermite cutting torch that may be used by clamping it against the work piece.

It is another object of the present invention to provide a thermite cutting torch that may be held against the work piece by a torch holder having means for striking the activation device within the torch.

These and other objects of the invention will become apparent through the following description and drawings.

BRIEF DESCRIPTION OF THE DRAWINGS

FIG. 1 is a side view of one embodiment of a nozzle for a thermite cutting torch according to the present invention.

FIG. 2 is a top view of the nozzle embodiment of FIG. 1.

FIG. 3 is a cross-sectional side view of the nozzle embodiment of FIG. 1.

FIG. 4 is a bottom view of the nozzle embodiment of FIG. 1.

FIG. 5 is an exploded cross-sectional side view of a thermite cutting torch utilizing the nozzle embodiment of FIGS. 1–4.

FIG. 6 is a cross-sectional side view of a thermite cutting torch utilizing the nozzle embodiment of FIGS. 1–4.

FIG. 7 is a side view of another embodiment of a nozzle for a thermite cutting torch according to the present invention.

FIG. 8 is a top view of the nozzle embodiment of FIG. 7.

FIG. 9 is a side cross-sectional view of the nozzle embodiment of FIG. 7.

FIG. 10 is a bottom view of the nozzle embodiment of FIG. 7.

FIG. 11 is an exploded cross-sectional side view of a thermite cutting torch utilizing the nozzle embodiment of FIGS. 7–10.

FIG. 12 is a cross-sectional side view of a thermite cutting torch utilizing the nozzle embodiment of FIGS. 7–10.

FIG. 13 is a side view of an alternative embodiment of a nozzle for a thermite cutting torch according to the present invention.

FIG. 14 is a top view of the nozzle embodiment of FIG. 13.

FIG. 15 is a cross-sectional side view of the nozzle embodiment of FIG. 13.

FIG. 16 is a bottom view of the nozzle embodiment of FIG. 13.

FIG. 18 is an exploded cross-sectional side view of a thermite cutting torch utilizing the nozzle embodiment of FIGS. 13–16.

FIG. 19 is a partially exploded cross-sectional side view of a thermite cuttng torch utilizing the nozzle embodiment of FIGS. 13–16.

FIG. 20 is a cross-sectional side view of a thermite cutting torch utilizing a nozzle embodiment of FIGS. 13–16.

Like reference numbers denote like elements throughout the drawings.

DETAILED DESCRIPTION

Figure 17:
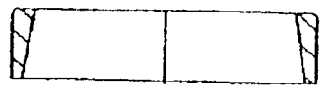
FIG. 17 is a side cross-sectional view of a compression ring utilized with the nozzle embodiment of FIGS. 13–16.

The present invention is an improved nozzle for use with thermite cutting torches. Throughout this description, reference numerals beginning with a 100 will refer to the embodiment of FIGS. 1–6, reference numerals beginning with 200 will refer to the embodiments of FIGS. 7–12, and reference numerals beginning with 300 will refer to the embodiments of FIGS. 13–20. The last two digits of the reference numerals will remain the same for substantially equivalent components throughout the various embodiments of the nozzle.

FIGS. 1–4 illustrate one embodiment of a nozzle of the present invention. The nozzle 100 includes an outer wall 102, defining a cutting aperture 104. The nozzle wall 102 also defines a throated top portion 106 of the aperture 104, and a workpiece-engaging surface 108 at the bottom of the nozzle. The workpiece-engaging surface 108 is preferably dimensioned and configured to match the surface of a workpiece. An example workpiece is a steel-reinforcement beam of a concrete wall, for example, one that must be breached by a military or law-enforcement entry team. Therefore, the workpiece-engaging surface 108 is preferably arcuate and concave, but may also be flat if a flat workpiece is to be cut. The workpiece-engaging surface 108 is preferably dimensioned and configured to center the cutting aperture 104 substantially perpendicular to the workpiece. The bottom surface or face 110 of the nozzle 100 also defines a groove 112. The groove 112 is substantially parallel to and in line with the aperture 104 when the aperture 104 is viewed from one end, and is preferably extends approximately linearly on either side of the aperture, and follows the arcuate surface 108 in the region of the aperture 104. The outside of the wall 102 defines a housing-engaging flange 114. An example of a material that can be employed for a nozzle of the present invention is high-density graphite, which has minimized erosion during a burn. Another example of such a material is mineral/phenolic. High temperature plastics, such as glass-filled polyetheretherketone, may also be used for such nozzles.

Referring to FIGS. 5–6, a thermite-based cutting torch utilizing the nozzle of FIGS. 1–4 is illustrated. The torch 116 includes the housing 118, the nozzle 100, and a charge tube 120. The housing 118 includes an upper threaded portion 122, defined on the inside of the housing's wall 124, for retaining a cap 125, and a lower nozzle retaining flange 126, inside the bottom edge of the housing's wall 124. The cap is dimensioned and configured to retain an activation device 136. The flange 126 is dimensioned and configured to abut the nozzle's flange 114, thereby retaining the nozzle within the housing.

The charge tube 120 includes an outer wall 128, dimensioned and configured to slidably fit within the housing's wall 124, and to abut the nozzle's flange 114, thereby retaining the nozzle's flange 114 between the charge tube's wall 128, and the housing's flange 126. The charge tube 120 also contains a thermite powder charge. One example of a thermite charge is a powder having, by weight, approximately 15% to 20% aluminum, 78% to 85% CuO, about 1% to 3% SiC, and about 0.2% to 4.0% nitrocellulose. Another example of such a thermite charge includes, by weight, approximately 16% to 18% aluminum, 80% to 83% CuO, 1% to 2% SiC, and 0.5% to 4% nitrocellulose. The charge tube 120 also includes means for providing an activation device 136.

Figure 21:
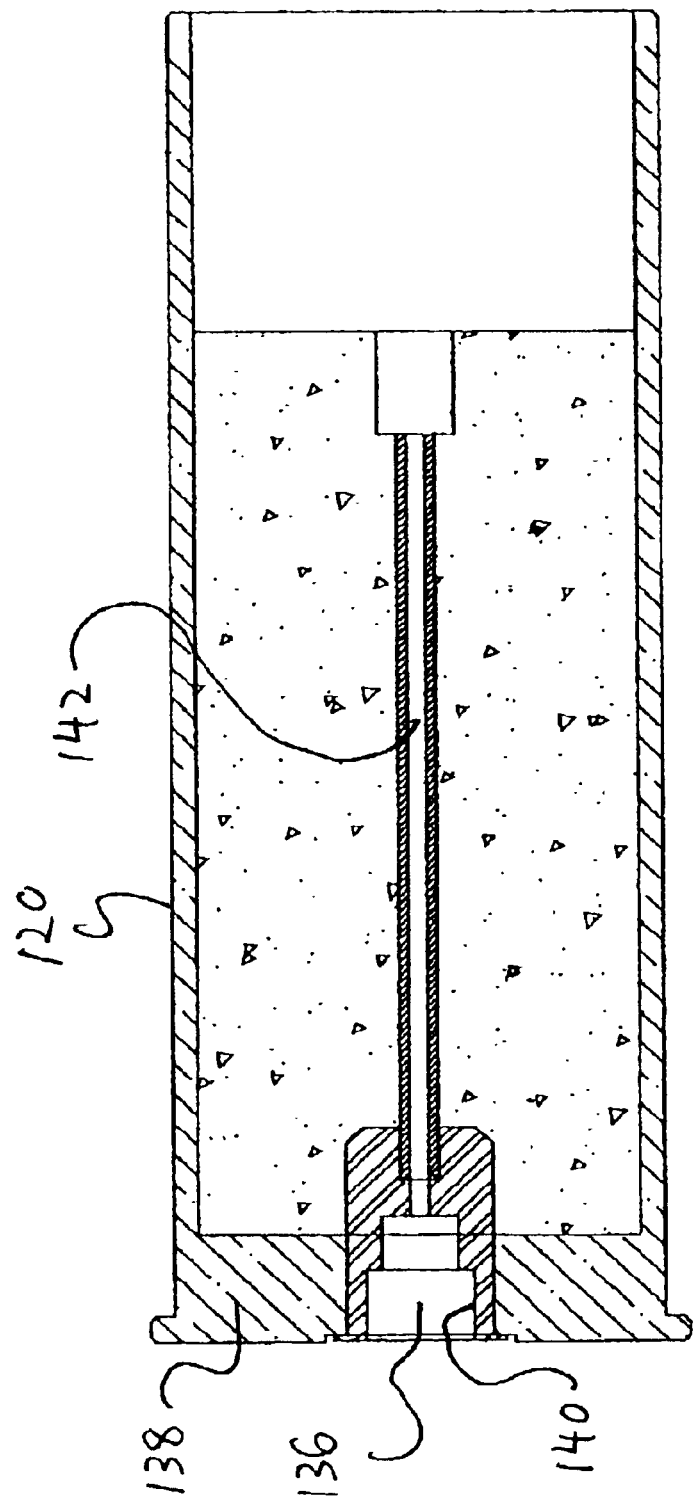
FIG. 21 is a cross sectional view of a charge tube for a thermite cutting torch.
Figure 22:
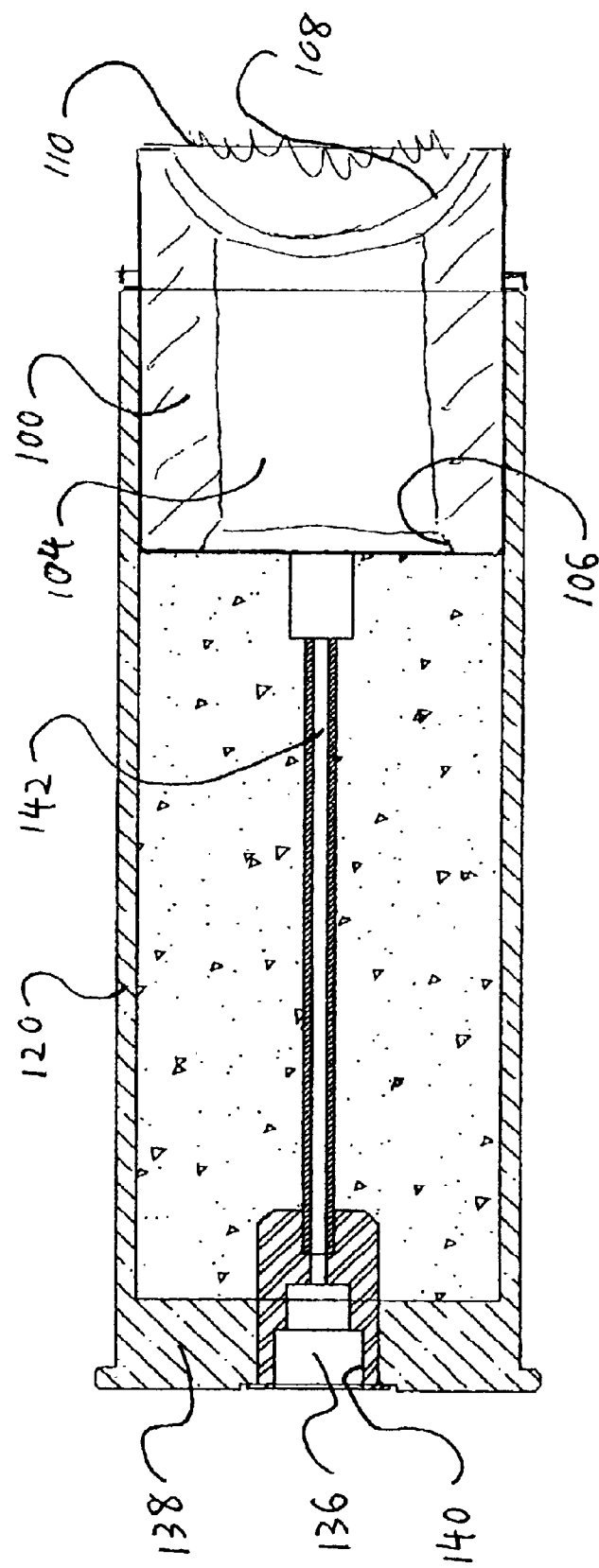
FIG. 22 is a cross sectional view of a thermite cutting torch using a charge tube of FIG. 21.

The cutting torch is assembled by first inserting the nozzle 100 into the housing 118, and then inserting the charge tube 120 into the housing 118, behind the nozzle 100. The cap 125, containing the activation device 136, may then be placed behind the charge tube 120. Alternatively, referring to FIGS. 21–22, some embodiments may utilize a charge tube 120 having a closed top end 138, defining a hole 140 therein for holding an activation device 136. The housing 118 may be omitted, as this embodiment will retain the nozzle 100 within the charge tube 120, and will support the charge tube 120 within a torch holder. The housings 218, 318 may likewise be omitted from other preferred torch embodiments, if the torch is used with a suitable torch holder.

The activation device 136 may be either a fuse, well known in the art of cutting torches, or a new activation device 136 of the present invention, including a percussion cap for igniting a fuse 142, which in turn ignites the thermite charge. Some examples of preferred percussion caps include small pistol primers and shotgun primers. The torch housing 116 is dimensioned and configured to fit within a torch holder having a trigger releasing a firing pin for striking the percussion cap. The trigger mechanism may be of several well-known types, including one wherein a spring-biased firing pin is released, one wherein a spring-biased hammer is released to strike the firing pin, or one wherein a spring biased hammer having the firing pin mounted thereon is released towards the percussion cap. The torch 116, when inserted into the chamber of the torch holder, will protrude slightly from the end of the chamber, allowing the torch holder to be used to hold the torch 116 against a workpiece. Pulling the trigger will then release the firing pin to strike the primer 136, thereby igniting the torch 116 and cutting the workpiece. This embodiment may also utilize the barrel and/or chamber of the torch holder to provide additional support for the nozzle 100. This embodiment may also utilize a magazine for holding a plurality of cutting torches 116, and sequentially feeding them into the chamber. Any of several well-known magazines may be used, including a belt, a revolving cylinder, a detachable box having a spring-biased follower, and/or a tube having a spring-biased follower.

In use, the torch 116 will be placed against a workpiece to be cut, with the arcuate surface 108 abutting the workpiece. The torch 116 is held or clamped in this position, with the arcuate surface 108 centering the workpiece within the nozzle 100. The torch is ignited using the activation device 136, and the cutting flame and reaction products are propelled by increasing pressure within the charge tube 120 out the nozzle 104, towards the workpiece. After striking the workpiece and contributing to the cutting operation, the flame and reaction products are directed out the groove 112, preventing backpressure in the region of the nozzle, and thereby eliminating the need for a standoff distance. By directing flame and reaction products through the groove, parallel to the line of the desired cut, the torch can also be used to cut a workpiece having a larger diameter or width than the torch itself.

Referring to FIGS. 7–10, another embodiment of the nozzle 200 is illustrated. The nozzle 200 includes an exterior wall 202 defining an aperture 204. The aperture 204 has a throated portion 206 at its top end, dimensioned and configured to funnel flame and reaction products into the aperture 204. The wall 202 also defines a bottom surface or face 210, defining an arcuate, concave surface 208. The arcuate surface 208 is dimensioned and configured to align a substantially round workpiece substantially perpendicular to the nozzle aperture 204. Alternatively, the surface 208 may be flat if a flat workpiece is to be cut. The nozzle face 210 also defines a groove 212. The groove 212 is substantially parallel to the aperture 204 when the aperture 204 is viewed from one end, and is preferably approximately linear on either side of the aperture, and follows the arcuate surface 208 in the region of the aperture 204. The groove 212 is dimensioned and configured to provide free flow of reaction particles parallel to the line of a desired cut, thereby minimizing backpressure within the nozzle region. The nozzle 200 also includes a nozzle retaining flange 214. As before, examples of materials for constructing the nozzle 200 include high-density graphite and mineral/phenolic. High temperature plastics, such as glass-filed polyetheretherketone, may also be used.

Referring to FIGS. 11–12, a thermite cutting torch 216 includes a housing 218, a nozzle 200, and a charge tube 220. The housing 218 includes a threaded portion 222 at the upper end of the wall 224, for securing a cap 225, wherein the activation device 236 is retained. The bottom end of the wall 224 includes a nozzle-retaining flange 226. The nozzle-retaining flange 226 is dimensioned and configured to abut the flange 214 of the nozzle, thereby retaining the nozzle 200 within the housing 218.

The charge tube 220 includes an exterior wall 228, dimensioned and configured to slidably fit within the housing's wall 224, and to abut the nozzle's flange 214. The charge tube 220 also includes a thermite-based powder charge. An example of such a powder charge includes approximately 15% to 20% aluminum, 78% to 85% CuO, 1% to 3% SiC and 0.2% to 4% nitrocellulose. Another example of such a thermite charge includes approximately 16% to 18% aluminum, 80% to 83% CuO, 1% to 2% SiC and 0.5% to 2% nitrocellulose.

The torch 216 is first assembled by inserting the nozzle 200 into the housing 218 until the flange 214 abuts the flange 226. The charge tube 220 is inserted into the housing 218 until the charge tube's wall 228 abuts the other side of the flange 214, thereby securing the nozzle 200 between the flange 226 and the charge tube 220. The cap 225 and activation device 236 may then be placed above the charge tube 220. Once these parts are assembled, it becomes apparent from FIG. 12 that the housing's wall 224 surrounds and provides external support for the nozzle 200.

The activation device 236 may be either a fuse, well known in the art of cutting torches, or a new activation device 236 of the present invention, including a percussion cap for igniting a fuse. Some examples of preferred percussion caps include small pistol primers and shotgun primers. The torch housing 216 is dimensioned and configured to fit within a torch holder having a trigger releasing a firing pin for striking the percussion cap. The trigger mechanism may be of several well-known types, including one wherein a spring-biased firing pin is released, one wherein a spring-biased hammer is released to strike the firing pin, or one wherein a spring biased hammer having the firing pin mounted thereon is released towards the percussion cap. The torch 216, when inserted into the chamber of the torch holder, will protrude slightly from the end of the chamber, allowing the torch holder to be used to hold the torch 216 against a workpiece. Pulling the trigger will then release the firing pin to strike the primer 236, thereby igniting the torch 216 and cutting the workpiece. This embodiment may also utilize the barrel and/or chamber of the torch holder to provide additional support for the nozzle 200. This embodiment may also utilize a magazine for holding a plurality of cutting torches 216, and sequentially feeding them into the chamber. Any of several well-known magazines may be used, including a belt, a revolving cylinder, a detachable box having a spring-biased follower, and/or a tube having a spring-biased follower.

To use the torch 216, the torch 216 is first brought into contact with the workpiece to be cut, with the arcuate surface 208 abutting the workpiece. The torch 216 is held or clamped in place, causing the arcuate surface 208 to center the aperture 204 over the desired cut. The thermite charge inside the charge tube 220 is activated, creating a flame and reaction product. Increasing pressure within the charge tube 220 pushes the flame and reaction products through the aperture 204 towards the workpiece. After striking the workpiece, they are directed out the groove 212, thereby preventing backpressure build-up in the nozzle area, eliminating the need for a standoff distance. By directing flame and reaction products through the groove, parallel to the cutting aperture, the torch can also be used to cut a workpiece having a larger diameter or width than the torch itself.

FIGS. 13–16 illustrate an alternative embodiment of the nozzle 300. The nozzle 300 includes an outer wall 302, defining a tapered portion 330, terminating an upper ledge 332 at its widest point. The wall 302 defines an aperture 304, having a throated top 306. The bottom or face of the nozzle 310 preferably defines a concave arcuate surface 308, dimensioned and configured to locate a substantially round workpiece substantially perpendicular to the aperture 304. Alternatively, the surface 308 may be flat, if a flat workpiece is to be cut. The nozzle face 310 also defines a groove 312. The groove 312 is substantially parallel to the aperture 304 when the aperture 304 is viewed from one end, and is preferably approximately linear on either side of the aperture, and follows the arcuate surface 308 in the region of the aperture 304. Preferred materials for fabricating the nozzle 300 include high-density graphite and mineral/phenolic. High temperature plastics, such as glass-filled polyetheretherketone, may also be used. The nozzle 300 will typically be utilized in conjunction with a compression ring 334, illustrated in FIG. 17, and dimensioned and configured to fit over the tapered portion 330.

Referring to FIGS. 18–20, a thermite-based torch 316 includes a housing 318, a nozzle 300, a compression ring 334, a charge tube 320, and means for activating the charge. The housing 318 includes a threaded portion 322 inside the upper end of the housing's wall 324, for retaining a cap 325, which retains an activation device 336. The bottom end of the housing 324 includes a nozzle-retaining flange 326, dimensioned and configured to abut the compression ring 334.

The charge tube 320 includes an exterior wall 328 dimensioned and configured to slidably fit within the housing 318, and to abut the upper ledge 332 of the nozzle 300. The charge tube 320 contains a thermite-based charge, for example, a powder comprising, by weight, approximately 15% to 20% aluminum, 78% to 85% CuO, 1% to 3% SiC, and 02.% to 4% nitrocellulose. Another example of a thermite powder includes, by weight, approximately 16% to 18% aluminum, 80% to 83% CuO, 1% to 2% SiC, and 0.5% to 2% nitrocellulose. The charge tube 320 also includes means for securing the thermite charge activation means.

To assemble a thermite-based torch 316, the compression ring 334 is first placed around the tapered portion 330 of the nozzle 300. The nozzle 300 and compression ring 334 are then inserted into the housing 318, until the compression ring 334 abuts the flange 326. The charge tube 320 is then inserted into the housing 318 until its wall 328 abuts the upper ledge 332 of the nozzle 300. The cap 325 and activation device 336 is then placed behind the charge tube 320.

The activation device 336 may be either a fuse, well known in the art of cutting torches, or a new activation device 336 of the present invention, including a percussion cap for igniting a fuse, which in turn ignites the thermite charge. Some examples of preferred percussion caps include small pistol primers and shotgun primers. The torch housing 316 is dimensioned and configured to fit within a torch holder having a trigger releasing a firing pin for striking the percussion cap. The trigger mechanism may be of several well-known types, including one wherein a spring-biased firing pin is released, one wherein a spring-biased hammer is released to strike the firing pin, or one wherein a spring biased hammer having the firing pin mounted thereon is released towards the percussion cap. The torch 316, when inserted into the chamber of the torch holder, will protrude slightly from the end of the chamber, allowing the torch holder to be used to hold the torch 316 against a workpiece. Pulling the trigger will then release the firing pin to strike the primer 336, thereby igniting the torch 316 and cutting the workpiece. This embodiment may also utilize the barrel and/or chamber of the torch holder to provide additional support for the nozzle 300. This embodiment may also utilize a magazine for holding a plurality of cutting torches 316, and sequentially feeding them into the chamber. Any of several well-known magazines may be used, including a belt, a revolving cylinder, a detachable box having a spring-biased follower, and/or a tube having a spring-biased follower.

To use the cutting torch 316, the torch 316 is first placed against a workpiece to be cut so that the arcuate surface 308 abuts the workpiece, thereby locating the aperture 304 above the location of the desired cut. The torch 316 is then held or clamped against the workpiece, so that the arcuate surface 308 will hold the torch 316 with the aperture 304 substantially perpendicular to the workpiece. The torch is activated, producing a flame and reaction product within the charge tube 320. The flame and reaction products are forced by high pressure inside the charge tube 320 through the aperture 304 towards the workpiece. After striking the workpiece, the flame and reaction products are directed out the groove 312, parallel to the line of the cut in the workpiece, thereby preventing backpressure from building up around the nozzle, and eliminating the need for a standoff distance. By directing flame and reaction products through the groove, parallel to the cutting aperture, the torch can also be used to cut a workpiece having a larger diameter or width than the torch itself.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A nozzle for a cutting torch, said nozzle comprising:
   an elongated aperture;
   a bottom face dimensioned and configured to orient said aperture substantially perpendicular to a workpiece;
   a groove within said bottom face, said groove being dimensioned and configured to direct flame and reaction products out of the nozzle substantially parallel to said elongated aperture, whereby back pressure within the nozzle is resisted; and
   said nozzle is fabricated from a material selected from the group consisting of mineral/phenolic and high temperature plastic.

2. The nozzle according to claim 1, wherein said aperture further comprises a throated top.

3. The nozzle according to claim 1, wherein said bottom face is arcuate.

4. The nozzle according to claim 1, wherein said bottom face is substantially flat.

5. A cutting torch, comprising:
   a housing;
   a charge tube dimensioned and configured to slidably fit within said housing, the charge tube containing a powder charge;

a nozzle dimensioned and configured be retained at one end of said charge tube, said nozzle comprising:
  an elongated aperture;
  a bottom face dimensioned and configured to orient said aperture substantially perpendicular to a workpiece; and
  a groove within said bottom face, said groove being dimensioned and configured to direct flame and reaction products out of the nozzle substantially parallel to said elongated aperture; whereby back pressure within the nozzle is resisted.

6. The cutting torch according to claim 5, further comprising a housing.

7. The cutting torch according to claim 6, wherein said housing further comprises an outside wall, said outside wall being dimensioned and configured to provide external support for said nozzle.

8. The cutting torch according to claim 5, wherein said aperture further comprises a throated top.

9. The cutting torch according to claim 5, wherein said nozzle is fabricated from a material selected from the group consisting of high temperature plastic and mineral/phenolic.

10. The cutting torch according to claim 5, wherein said bottom face is arcuate.

11. The cutting torch according to claim 5, wherein said bottom face is substantially flat.

12. The cutting torch according to claim 5, further comprising a percussion cap dimensioned and configured to ignite a fuse, which ignites the powder within said charge tube upon being struck.

* * * * *